Patented July 25, 1933

1,920,026

UNITED STATES PATENT OFFICE

NATHANIEL TISCHLER, OF BRISTOL, PENNSYLVANIA, ASSIGNOR TO ROHM & HAAS COMPANY, A CORPORATION OF DELAWARE

ELIMINATION OF INSECT INFESTATION

No Drawing.    Application filed November 25, 1929. Serial No. 409,768.

The term "insect", as connected with the word "insecticide" in this application, is understood to mean any of the numerous, small invertebrate animals, generally having the body segmented, for the most part belonging to the class "Insecta", generally comprising six-legged, usually winged forms such as beetles, bugs, bees, flies, etc., and to other allied classes of Arthropoda, whose members are wingless and usually have more than six legs, such as spiders, mites, ticks, centipedes, wood lice, etc.

The elimination of insect infestation through the use of chemical insecticides proceeds in three general ways: by application of an insecticidal material which produces death when brought into contact with the insect; by spreading about materials which are poisonous to insects so that the insect will be led to eat them; and by the employment of insecticidal vapors or gases which permeate the insect infested areas and produce paralysis and death.

There are marked limitations to the first two methods of exterminating insects. In the first case, the insecticide must be brought directly into contact with the insect which it is desired to kill. In the second case, materials must be left about which may be dangerously toxic to man and to domestic animals and which may be offensive by their presence. The fumigation method would, in the case of an ideal fumigant, be the most satisfactory if the ideal fumigant would reach every insect within the area being fumigated, penetrating into the hiding places of the insects and if, after the fumigation has been completed, there would be no dangerous or objectionable residues.

Accordingly, many compounds have been investigated to determine their value as insecticidal fumigants. Of these, one of the most commonly employed is hydrocyanic acid but its extremely high toxicity to man and animals, which makes the utmost precaution necessary in its application, coupled with the fact that it does not penetrate closely packed materials readily and that many insects are able to resist its action over a considerable period of time, renders it of questionable value. Another widely used fumigant (and thruout this application it is understood that the term "fumigant" refers to insecticidal fumigants) is carbon disulphide which was formerly very much used for the extermination of insect pests in stored grain. This material is, however, objectionable on account of its offensive and persistent odor, its effect upon the baking qualities of flour, and particularly is most highly objectionable on account of the fire hazard which attends its use. Chloropicrin has been used but its vesicant action upon the skin, and its highly irritating and toxic properties have prevented its extensive use. The irritation attending the use of certain chloroacetates has also rendered their use objectionable. Sulphur dioxide has been suggested and used but its toxicity to insects is not high. Moreover, its markedly corrosive effect on metals and its action in destroying the germinating power of wheat and in hindering fermentation has decidedly limited its value. Carbon dioxide has been suggested and employed but it escapes so readily and must be employed in such high concentrations that its use has never proven practical. Ethyl acetate has been recommended, but the very high concentration necessary for its efficacy has practically ruled it out. Ethylene dichloride, one of the newer recommended fumigants, because of its relatively poor power of penetration must be used at fairly high concentrations. Ethylene oxide, another of the newer recommended fumigants, also lacks penetrative power and, moreover, its high cost makes it prohibitive for more general use.

The need, then, for a fumigant which would not be highly toxic to man or animals; which could be used without the employment of special protective equipment, such as gas masks; which would be highly penetrative and highly toxic to insects at relatively low concentrations; which would be readily volatile; which would be available in quantities at a reasonable price; which would leave no objectionable odor or residue in foodstuffs; which would not affect germination of seeds; which would be non-corrosive to metals, etc.; and which would be relatively safe from fire hazard; has long been evident.

It has been known that certain saturated aliphatic alcohols possess some insecticidal value as fumigants. I have found that the toxicity of these alcohols increases as the number of methyl groups attached to the hydroxyl bearing carbon atom increases; and, furthermore, I have found that a three times methylated carbon atom possessing an hydroxyl group showed the highest toxicity and has the greatest penetrative power. This compound, known in chemical literature as tertiary butyl alcohol, has not hitherto been reported in insecticidal literature, probably because hitherto it has not been commercially available.

Tertiary butyl alcohol possesses to a considerable extent many of the virtues outlined for an ideal fumigant. Tertiary butyl alcohol can be dispersed in a closed space in a concentration of 0.08 grams per liter (0.08 grams per liter=5 lbs. per 1000 cu. ft.) for 16 hrs. without killing the white rat, such as is commonly used as a test animal. Tertiary butyl alcohol produces no serious ill effects upon the person applying it as a fumigant even though he exposes himself freely to the vapors during the fumigation operation. Only carbon disulphide (whose highly objectionable features have been noted) of all the commercially recommended fumigants, shows a higher degree and a faster rate of penetration, through such materials as grain, than tertiary butyl alcohol. Tertiary butyl alcohol, at the rate of five pounds per thousand cubic feet, penetrated a bin of wheat to a depth of two feet in twenty-four hours, killing 100% of the insects to a depth of one and one-half feet, and killing or seriously affecting those insects between one and one-half and two feet in twenty-four hours. At the rate of ten pounds per thousand cubic feet, tertiary butyl alcohol killed all insects to a depth of five feet in forty-five hours. The degree of penetration may be increased and inflammability may be further decreased by simultaneous introduction of carbon dioxide. The insecticidal effects of tertiary butyl alcohol upon insects directly exposed to its vapor were noted at the rate of one-half pound per thousand cubic feet. The volatility of tertiary butyl alcohol is high since it boils at 84° C. Tertiary butyl alcohol does not corrode metals at ordinary temperatures. Tertiary butyl alcohol does not affect the germination power of seeds. Tertiary butyl alcohol can be made available readily in any quantity and is obtained from raw materials which are sufficiently abundant to assure that its cost will not be prohibitive. The fire hazard attending its use is low and may be further decreased by the introduction or joint application of some noninflammable material such as, for example, carbon tetrachloride. Applied in concentrations of 0.08 grams per liter of room capacity, tertiary butyl alcohol vapors do not propagate a flame at 120° F. when mixed with air. In higher concentrations, for example, 0.2 grams per liter, it will propagate a flame at this temperature if mixed with air but the addition of an equal proportion of carbon tetrachloride prevents this flash. In place of carbon tetrachloride, other chlorinated hydrocarbons or other fire preventing agents may be employed but, on account of its cheapness and ready volatility, I prefer to use carbon tetrachloride. In addition to its value as a fumigant in its own right, tertiary butyl alcohol is a valuable solvent for other insecticides and insecticidal fumigants; thus ethylene dichloride, which has been reported to be an effective fumigant, is freely miscible with tertiary butyl alcohol; and this solution is easily kept at temperatures as high as 85° F. Methyl monochloroacetate dissolves readily in tertiary butyl alcohol and the resulting solution possesses desirable insecticidal properties. Similarly ethylene oxide may be dissolved in tertiary butyl alcohol and may thus be applied in the form of a liquid with the use of no special apparatus.

In giving these examples, I do not wish to limit myself to the use of the particular materials mentioned but they are listed only as examples.

Any of the usual methods employed in the application of fumigants may be used in fumigating with tertiary butyl alcohol; thus it or solutions or mixtures of other substances in it or emulsions of other substances with it may be poured, suspended or sprayed over the surface of grain or other substances which it is desired to fumigate. Insects in clothing, furniture, furs, etc., may be exterminated by exposure to the fumes of tertiary butyl alcohol in a fumigating vault or chamber. Room, or hall, or warehouse, or, in general, building fumigation may be carried out by spraying tertiary butyl alcohol or solutions or mixtures of other substances in it into the air until the necessary amount has been introduced or by evaporating this material or solutions or mixtures of other substances in it by the application of heat such as by electrically heated units or steam coils; or by wetting cloths of large area and allowing the tertiary butyl alcohol or solutions or mixtures of other substances in it to evaporate from these porous surfaces. Other methods of application may be employed and with similar results.

I claim:

1. An insecticide and fumigant comprising tertiary butyl alcohol.

2. An insecticide and fumigant comprising a mixture of tertiary butyl alcohol and carbon tetrachloride in such amounts as to be noninflammable at ordinary temperatures.

NATHANIEL TISCHLER.